(12) United States Patent
Bakar et al.

(10) Patent No.: US 9,635,433 B2
(45) Date of Patent: *Apr. 25, 2017

(54) PROXIMITY DETECTION BY MOBILE DEVICES

(71) Applicant: GOOGLE INC., Mountain View, CA (US)

(72) Inventors: Majd Bakar, San Jose, CA (US); Francis Tsui, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/200,965

(22) Filed: Mar. 7, 2014

(65) Prior Publication Data
US 2014/0259047 A1   Sep. 11, 2014

Related U.S. Application Data

(63) Continuation-in-part of application No. 13/790,637, filed on Mar. 8, 2013.

(51) Int. Cl.
*H04N 21/6371*  (2011.01)
*H04W 4/02*  (2009.01)
(Continued)

(52) U.S. Cl.
CPC ......... *H04N 21/6371* (2013.01); *G08C 17/02* (2013.01); *H04W 4/023* (2013.01);
(Continued)

(58) Field of Classification Search
CPC ......... H04R 3/00; H04B 11/00; H04W 12/06; H04W 4/023; H04W 4/021; H04W 4/008; H04W 8/005
See application file for complete search history.

(56) References Cited

U.S. PATENT DOCUMENTS 7,894,769 B2   2/2011   Ganley et al.
7,996,514 B2   8/2011   Baumert et al.
(Continued)

FOREIGN PATENT DOCUMENTS

WO   2008113827 A2   9/2008
WO   2012/148242 A2   11/2012
WO   2014/138604 A1   9/2014

OTHER PUBLICATIONS

"Set up the Netflix App", Netflix on Xbox Live, dated Jan. 7, 2012, retrieved on Feb. 11, 2013 from support. xbox.com/en-US/apps/netflix/netflix-setup, 2 pages.
(Continued)

*Primary Examiner* — Jean Gelin
(74) *Attorney, Agent, or Firm* — Brake Hughes Bellermann LLP

(57) ABSTRACT

A method includes initiating, by a processor of a device, a listening session including listening for a message from a mobile device and receiving the message from the mobile device via a microphone of the device, the message including configuration data for a network, and in response to receiving the message from the mobile device, initiating an access session with the network using the configuration data. In some implementations, the device is coupled to a media player. The media player may be a television. The configuration data may include at least one of an identifier for the network or a password for the network. In some implementations, the initiating occurs only after the device fails to connect to any network. In some implementations, the message is encoded in a sub-sonic signal.

17 Claims, 7 Drawing Sheets

(51) Int. Cl.
*G08C 17/02* (2006.01)
*H04L 29/08* (2006.01)
*H04W 12/06* (2009.01)

(52) U.S. Cl.
CPC ..... *G08C 2201/30* (2013.01); *G08C 2201/93* (2013.01); *H04L 67/125* (2013.01); *H04W 12/06* (2013.01)

(56) References Cited

U.S. PATENT DOCUMENTS

| | | | |
|---|---|---|---|
| 8,214,853 B2 | 7/2012 | Dasher et al. | |
| 8,316,400 B1 | 11/2012 | Kravets | |
| 2004/0052387 A1* | 3/2004 | Norris | H04R 1/403 381/190 |
| 2005/0219068 A1* | 10/2005 | Jones | G01S 5/30 341/50 |
| 2006/0259927 A1 | 11/2006 | Acharya et al. | |
| 2007/0115876 A1 | 5/2007 | Doshi et al. | |
| 2007/0149124 A1 | 6/2007 | Onozawa | |
| 2007/0297426 A1 | 12/2007 | Haveson et al. | |
| 2008/0181154 A1 | 7/2008 | Sherman | |
| 2009/0116441 A1* | 5/2009 | Park | H04W 52/0245 370/329 |
| 2009/0210932 A1 | 8/2009 | Balakrishnan et al. | |
| 2009/0252355 A1 | 10/2009 | Mao | |
| 2010/0081466 A1 | 4/2010 | Mao | |
| 2010/0199341 A1 | 8/2010 | Foti et al. | |
| 2010/0274859 A1 | 10/2010 | Bucuk | |
| 2010/0297946 A1* | 11/2010 | Alameh | H04M 1/7253 455/41.3 |
| 2011/0067075 A1 | 3/2011 | Barry | |
| 2011/0211524 A1 | 9/2011 | Holmes et al. | |
| 2011/0320612 A1 | 12/2011 | Oka et al. | |
| 2012/0051187 A1* | 3/2012 | Paulson | H04B 1/06 367/135 |
| 2012/0093141 A1 | 4/2012 | Imes et al. | |
| 2012/0108282 A1 | 5/2012 | Li et al. | |
| 2012/0159338 A1* | 6/2012 | Mountanos | H04N 21/482 715/738 |
| 2012/0243158 A1* | 9/2012 | Gentil | G09G 5/006 361/679.03 |
| 2013/0115940 A1* | 5/2013 | Zhou | H04W 48/16 455/426.1 |
| 2013/0336497 A1* | 12/2013 | Duplan | H04R 3/00 381/77 |
| 2014/0057563 A1 | 2/2014 | Salahshoor et al. | |
| 2014/0064258 A1 | 3/2014 | Montag et al. | |
| 2014/0087770 A1 | 3/2014 | Cho et al. | |
| 2014/0253813 A1 | 9/2014 | Bakar | |
| 2014/0284323 A1* | 9/2014 | Albrecht | B23K 9/10 219/660 |

OTHER PUBLICATIONS

"Meet Roku", dated Jan. 16, 2013, retrieved on Feb. 20, 2013 from www.roku.com/meet-roku, 3 pages.
"Meet Boxee TV", Boxee, Inc., retrieved on Feb. 20, 2013 from www.boxee.tv/#/features, 36 pages.
International Search Report and Written Opinion for PCT Application No. PCT/US2014/021830, mailed on Jun. 24, 2014, 12 pages.
International Preliminary Report on Patentability for PCT/US2014/021830, mailed Sep. 17, 2015, 10 pages.
Non-Final Office Action for U.S. Appl. No. 13/790,637, mailed Nov. 5, 2015, 15 pages.
Response to Non-Final Office Action filed for U.S. Appl. No. 13/790,637, filed Feb. 5, 2016, 10 pages.
Office Action for EP Application No. 14714059.4, mailed Aug. 12, 2016, 6 pages.

* cited by examiner

PROXIMITY DETECTION BY MOBILE DEVICES

RELATED APPLICATIONS

This application claims priority to, and is a continuation-in-part of, U.S. Nonprovisional patent application Ser. No. 13/790,637, filed on Mar. 8, 2013, entitled "PROXIMITY DETECTION BY MOBILE DEVICES", the disclosure of which is incorporated by reference herein in its entirety.

TECHNICAL FIELD

This disclosure generally relates to interactions between a device such as a media player, and a mobile device.

BACKGROUND

Certain devices may connect to wireless networks, but may come with no standalone input method to be able to configure or control the devices. In some cases, a connected device with rich input method can connect to a specific device and configure the specific device, or manage it by sending commands to the specific device. Some solutions require specialized hardware on both devices. Other solutions do not work for an initial setup where the specific device is not yet on the wireless network, or if the other devices are not on the same wireless network.

SUMMARY

According to one implementation, a method includes initiating, by a processor of a device, a listening session including listening for a message from a mobile device and receiving the message from the mobile device via a microphone of the device, the message including configuration data for a network, and in response to receiving the message from the mobile device, initiating an access session with the network using the configuration data. In some implementations, the device is coupled to a media player. The media player may be a television. In some implementations, the configuration data includes at least one of an identifier for the network or a password for the network. The network may include at least one of a WIFI network, a BLUETOOTH network, an audio channel, or a near field communication network. In some implementations, the initiating occurs only after the device fails to connect to any network. In some implementations, the message is encoded in a sub-sonic signal.

Other implementations of this aspect include corresponding systems, apparatus, and computer programs, configured to perform the actions of the methods, encoded on computer storage devices.

According to another implementation, a method includes initiating, by a processor of a mobile device, a listening session including listening for a signature from a removable device, wherein the removable device is coupled to a media player and wherein the signature is encoded in a sub-sonic signal, detecting the signature, and in response to detecting the signature, initiating, by a processor of a mobile device, an access session with the removable device, using the signature.

In some implementations, the method includes initiating a broadcast session including broadcasting the signature from the media player. The media player may be a television. prior to initiating the listening session, receiving a notification from a location service that the mobile device is within a predetermined range of the removable device, and in response to receiving the notification, activating a microphone of the mobile device. The sub-sonic signal may be a pulse coded modulation signal. In some implementations, the method includes interpreting the signature by the mobile device. The signature may be a unique pattern that includes access information that allows the mobile device to pair with the removable device.

Other implementations of this aspect include corresponding systems, apparatus, and computer programs, configured to perform the actions of the methods, encoded on computer storage devices.

One or more of the implementations of the subject matter described herein may provide one or more of the following advantages. The disclosed methods and systems allow discovery and interactivity between a mobile device and a media player device without the need for specialized hardware. For example, a user may walk from one room of a house to another, while the user's phone may automatically pair and un-pair with the closest television, without requiring user input for the pairing or un-pairing. Further advantages include an increased ability for a media player device to locate a roaming mobile device when the media player device is nearby but on a network that the mobile device is not connected to.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
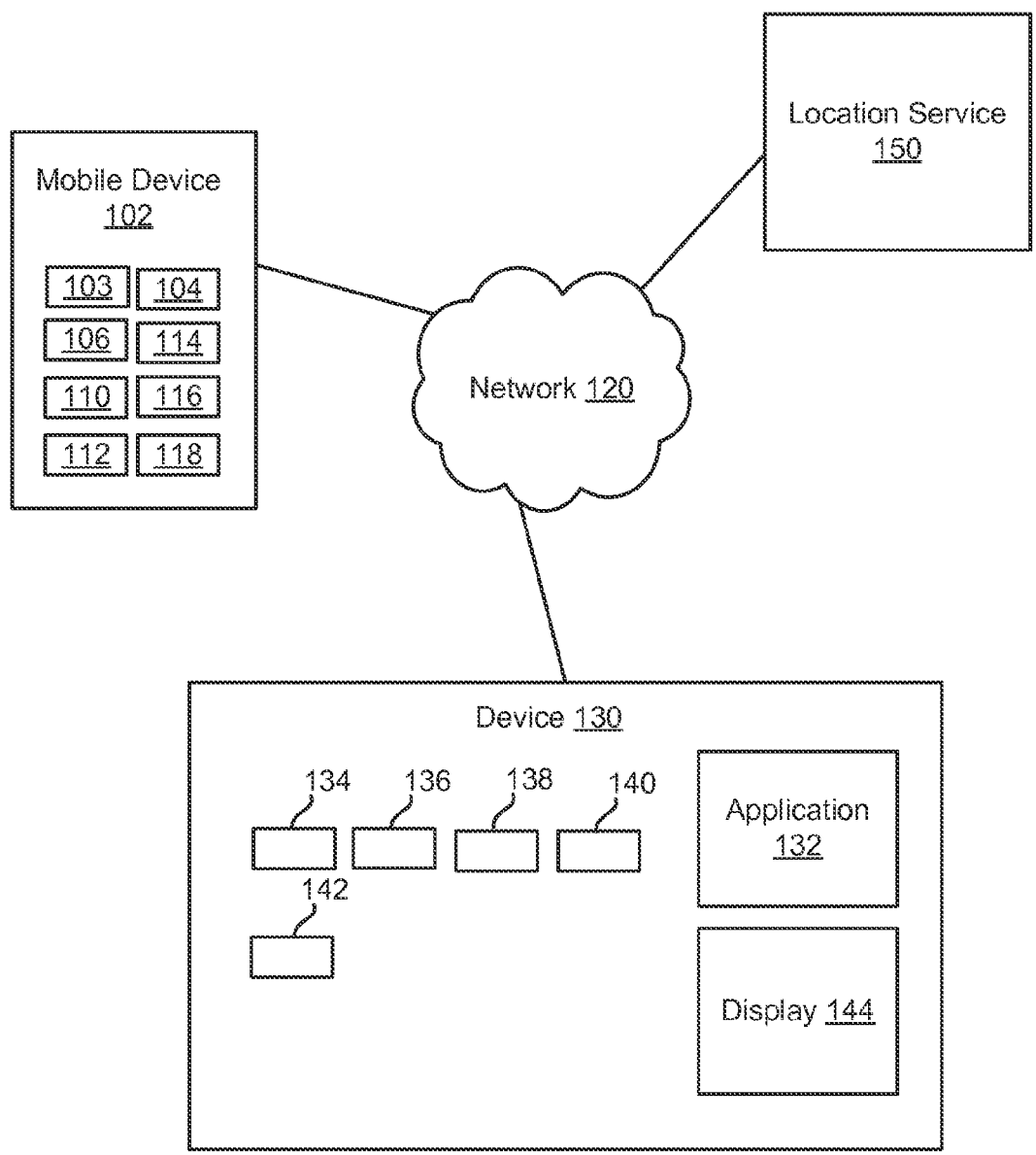
FIG. 1 is a block diagram of a system that can be used to provide device detection.

FIG. 1 is a block diagram of a system that can be used to provide identification delegation. System 100 may include a mobile device 102, a device 130, and a location service 150, which are interconnected through at least one network 120.

Mobile device 102 may be a computer, a smart phone, a laptop, or a similar device that may execute a user interface, download and execute software applications, and communicate with device 130, and location service 150. Mobile device 102 may include a display screen 103 and a device detection application 104 that a user downloaded (e.g., installed) from a website or online application store. In some implementations, the device detection application 104 may recognize various sensors that are associated with mobile device 102, and may communicate with those sensors. For example, mobile device 102 may include a variety of sensors, such as a radio frequency (RF) sensor 106, a microphone 110, a GPS sensor 112, a BLUETOOTH sensor 114, a WIFI sensor 116, and an infrared sensor 118. The sensors illustrated in mobile device 102 are merely for illustration, as other sensors may be included. Various alternative and additional examples of mobile devices are described in more detail below with respect to FIG. 4.

Network 120 may be a single network or a combination of any type of computer network, such as a Local Area Network (LAN) or a Wide Area Network (WAN), a WIFI network, a BLUETOOTH network, or other network. In addition, network 120 may be a combination of public (e.g., Internet) and private networks.

Device 130 is a computing device with an application 132 and a display screen 144. As an example, device 130 may be a television. Device 130 may execute software applications (such as application 132) and may communicate with mobile devices 102 and location service 150. Device 130 may include various components that may emit various signals, such as an audio component 134, an infrared component 136, a WIFI component 138, a BLUETOOTH component 140, and a radio frequency component 142. The components illustrated in association with device 130 are merely for illustration, as other components may be included. Various alternative and additional examples of devices are described in more detail with respect to FIG. 4.

The device 130 may periodically or continuously broadcast various identification signals (e.g., beacon signals) over network 120. The device 130 may send signals over different networks simultaneously. For example, device 120 may send audio, BLUETOOTH, and WIFI beacon signals at the same time. In some implementations, as discussed in more detail below with respect to FIG. 2, the device 130 may emit a unique identification signal over network 120. As an example, the unique identification signal may include a basic service set identification (BSSID) that is entered or programmed by a user of the device 130. In some implementations, the unique identification signal may be unique because it is randomly generated. The unique identification can be a globally unique identifier (GUID), which may have a probability of the same number being generated randomly twice being negligible, or a universally unique identifier (UUID), or a name that matches a certain pattern, as examples. The mobile device 102 may detect various signals emitted by one or more components of the device 130, using various sensors, for example when mobile device 102 comes within a predetermined range of device 130. For example, the infrared sensor 118 of mobile device 102 may detect an infrared signal emitted by infrared component 136 of device 130. As another example, the microphone 110 may detect an audio signal emitted by audio component 134.

In some implementations, mobile device 102 may automatically listen for such signals periodically, in a defined pattern, or at all times, without user input, even when a display screen of the mobile device is dimmed, in sleep mode, or otherwise not active. In various implementations, mobile device 102 may be configured by a user to listen for such signals. Listening for signals may include activating a component, an application, a microphone, or other feature of the mobile device 102, to detect a signal. As an example, mobile device 102 may listen for signals via components 106, 110, 112, 114, 116, and 118 for example using application 104. Application 104 may, in some implementations, request that a user enter a login or other user account credentials to listen for signals.

The location service 150 may be a computer or device that provides location services, as discussed in more detail below. In the arrangement shown in FIG. 1, device 130, which may be a television, may optionally identify itself to the location service 150 and may, for example by providing coordinates, GPS data, WIFI signals, other signals such as near field communication signals, or information from which the location service 150 may identify or approximate the location of device 130. Similarly, the mobile device 102 may also identify itself to the location service 150. In some implementations, the location service 150 may maintain a data store of all devices (including, for example, mobile device 102) that have identified themselves to the service, as well as other information associated with the devices, such as location data. In some implementations, where users have consented to the use of such data, the location service 150 may obtain location information about device 130 in other ways, for example by receiving data from other devices (not shown) that have connected to or identified the device 130.

In some implementations, mobile device 102 may receive information from location service 150 about device 130 (e.g., location data). As an example, mobile device 102 may receive a notification from location service 150. The notification may include a message that the mobile device is within a predetermined range (e.g., 50 feet) of device 130. In response to receiving the notification, the mobile device may automatically begin to search network 120 for a unique signal from the device 130. For example, the mobile device 130 may search for and detect a WIFI signal (emitted from the WIFI component 138 of device 130) using the WIFI sensor 116. As an example the WIFI signature could be a WIFI BSSID pattern of any set of number or letters.

It will be appreciated that any number of alternative or additional networks, servers, services, mobile devices, or devices may be included in system 100. The use of one mobile device 102, one device 130, and one location service, is merely for illustration. Moreover, it will be appreciated that the illustration depicted in FIG. 1 does not illustrate proximity. For example, as discussed in more detail below, in various implementations, mobile device 102 may be within five feet of device 130, while location service 150 is located at a different location.

One or more of the implementations of the subject matter described herein may provide one or more of the following advantages. The disclosed methods and systems allow discovery and interactivity between a mobile device and a media player device without the need for explicitly pairing the two devices. For example, a user may walks from one room of a house to another, while the user's phone may automatically pair and un-pair with the closest television, without requiring user input for the pairing or un-pairing.

Figure 2:
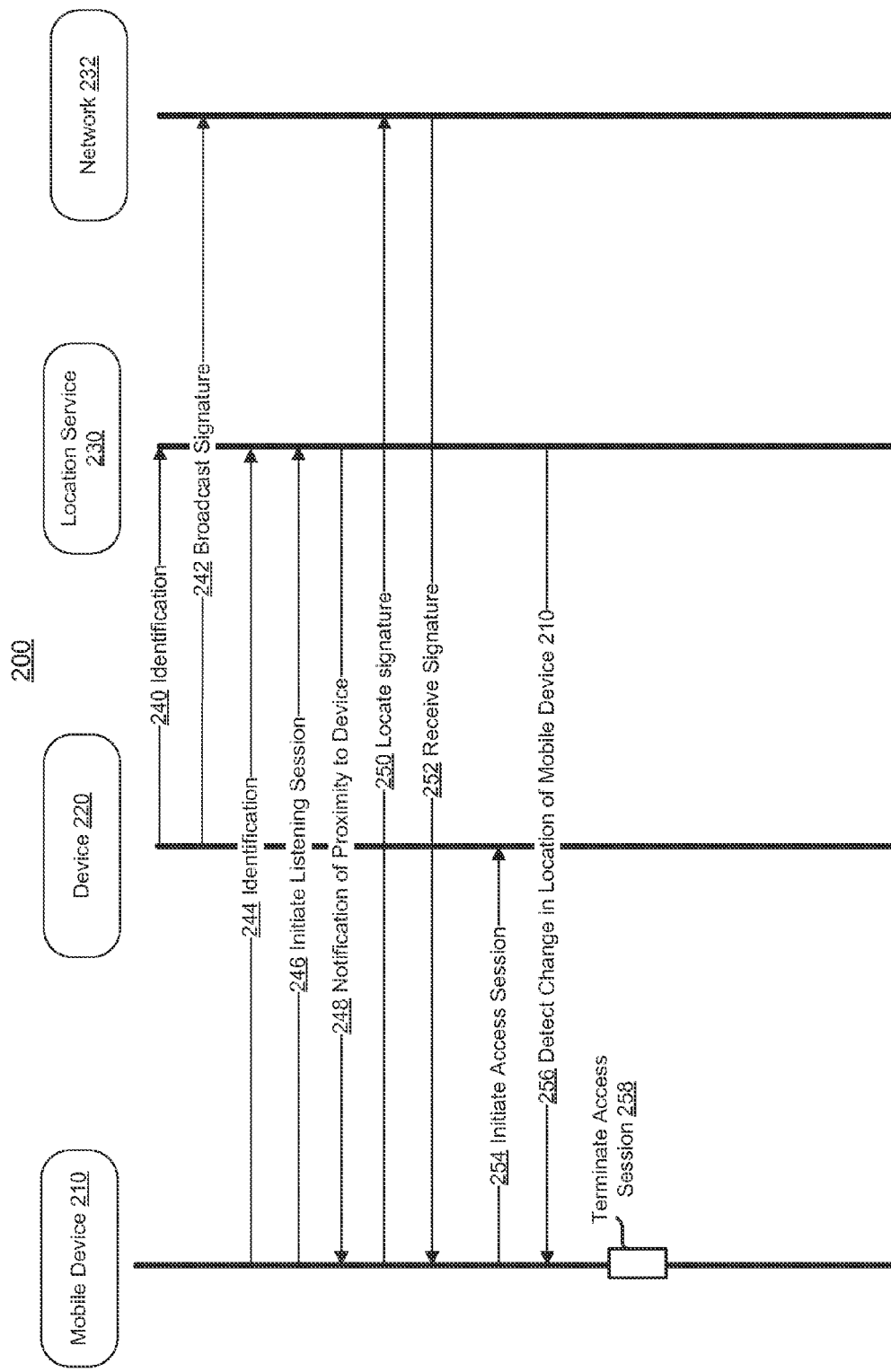
FIG. 2 is a sequence diagram illustrating an example of a system implementing device detection.

FIG. 2 is a sequence diagram illustrating an example of a system 200 implementing device detection. The system 200 may include a mobile device 210, a device 220, a location service 230, and a network 232. The mobile device 210 may be a smartphone or laptop, such as device 102 shown in FIG. 1, which may execute applications. In one example, a device detection application may have been downloaded from a service or content provider web site or an online application store (such as device detection application 104 described above with respect to FIG. 1).

The device 220 may be a media player, for example a television or a gaming device such as an XBOX, which can interact with a video streaming data service. In the illustrated embodiment, the black lines associated with each of the components of the system (e.g., mobile device 210, device 220) represent the execution, by at least one microprocessor, of a process associated with that component.

The location service 230 may be a service operated by at least one remote server, such as the location service 150 described above with respect to FIG. 1. The network 232 may be any type of network or combination of networks, such as described in more detail below with respect to FIG. 4. Although the network 232 is depicted as a separate element from the location service 230, in some implementations, the network 232 may be used for communications between the location service 230 and the mobile device 210 and the device 220. In the illustrated implementation, FIG. 2 shows an example of a detection of the mobile device 210 within a predetermined range of device 220.

Action 240 illustrates that, in one implementation, an identification is made by the device 220 to the location service 230. Such an identification may be sent by an application (e.g., a device detection application) that is resident on the device 220 or that was downloaded to the device 220 from a service or content provider web site. The identification may include, as examples, a name, IP address, unique identifier, and location data of the device 220. In some implementations, the identification 240 may be made once, when the device 220 is initiated, and it will be understood that action 240 is an optional action.

Action 242 illustrates that the device 220 periodically broadcasts a unique signature over the network 232. In some implementations, the unique signature may be a unique BSSID pattern and the network 232 may be a WIFI network. In some implementations, the device 220 may emit a unique signature over more than one network 232 at a time. For example, the device 220 may emit a unique BLUETOOTH signature, a unique BSSID signature, a unique audio signal, and a unique infrared signal at the same time across one or more networks. In some implementations, the device 220 may emit a combination of signals as its unique signature (such as an infrared signal and an audio signal). The signals may be emitted periodically.

Action 244 illustrates that the mobile device 210 makes an identification to the location service 230. Such an identification may be made by a device detection application downloaded to the mobile device 210 from a service or content provider web site. The identification may include, as examples, a name or unique identifier of the mobile device 210, and location data of the mobile device 210 (e.g., including GPS or WIFI data). In some implementations, the identification 244 may be made once, and in some implementations, some or all the identification 244 may be continuous or periodic (e.g., the mobile device 210 may send GPS location to the location service 230 every hour or every time the device detection application is initiated, or every time the location of the mobile device 210 changes by more than 100 meters). In various implementations, the location service 150 may extrapolate a location of the mobile device 210 (e.g., on a continuous or periodic basis) using information provided by the mobile device.

Action 246 illustrates that the mobile device 210 initiates a listening session with the location service 230. In some implementations, the listening session may be initiated every time the device detection application is initiated or is otherwise executing. In some implementations, action 246 may be continuous or periodic (e.g., the mobile device 210 may initiate a listening session with the location service 230 every hour or every time the display screen of the mobile device 210 is turned on).

The location service 230 may perform a calculation to determine the proximity of the mobile device 210 to the device 220, for example based on GPS coordinates, relative location of the devices, information provided by device 220 when it identified itself to the location service 230, etc. This proximity calculation can be based on a threshold distance (e.g., 500 feet) so that one or more devices within a threshold distance of one another may be notified or otherwise informed of a proximity to another device. In some implementations, the location service 230 may only account for registered (e.g., identified) devices that have identified themselves to location service 230 using an application such as device detection application 104 shown in FIG. 1.

Action 248 illustrates that location service 230 notifies the mobile device 210 of its proximity to the device 220. In some implementations, the notification may include a message that the mobile device is within a predetermined range (e.g., 50 feet) of device 220. In response to receiving the notification, the mobile device may automatically begin to search network 232 for a signature signal from the device 220, as illustrated by action 250. For example, the mobile device 210 may search for and detect a WIFI signal (emitted from a WIFI component of the device 210) using a WIFI sensor of the mobile device. In some implementations, the mobile device 210 may request a user input or authorization before searching the network 232.

Action 252 illustrates that the mobile device 210 receives the signature from the network 232. In some implementations, the signature may contain information about how to access the device 220, such as location information. Upon or after receiving the signature, the mobile device may initiate an action session with the device 220, as illustrated by the action 254 (for example, using the location information and signature). The access session may include, as an example, a user interface display on the mobile device 210, which may be used to control aspects of a user interface or other display of the device 220. For example, a user of the mobile device 210 may use the mobile device 210 as a remote user interface to control movies, music, or other content provided on a display screen of device 220.

Action 256 illustrates that the location service 230 may detect a change in the location of the mobile device 210. The location service 230 may detect the change based on, for example, GPS coordinates of the mobile device 210. In response to detecting a change in the location of the mobile device 210, the location service 230 may notify the mobile device 210, and the mobile device 210 may terminate the access session with the device 220, as illustrated by action 258, or perform a user visible action on the screen of the device 220. In some implementations, the mobile device 210 (for example using the same device detection application that accessed the device 220) may itself detect a change in its location, such that the mobile device 210 is no longer within the predetermined range of the device 220. In that example, the mobile device may automatically terminate the access session (e.g., using the device detection application), for example without any user input. In some implementations, the device 220 may terminate the access session instead of the mobile device 210. A user may also terminate the access session at any time, for example via a user interface of the mobile device 210 or the device 220.

In various implementations, the system 200 may allow for multiple pairings and un-pairings between mobile devices and media player devices without requiring user actions. For example, as a user walks from one room of a house to another, the user's phone may automatically pair and un-pair with the closest television, using system 200, without requiring user input.

Figure 3:
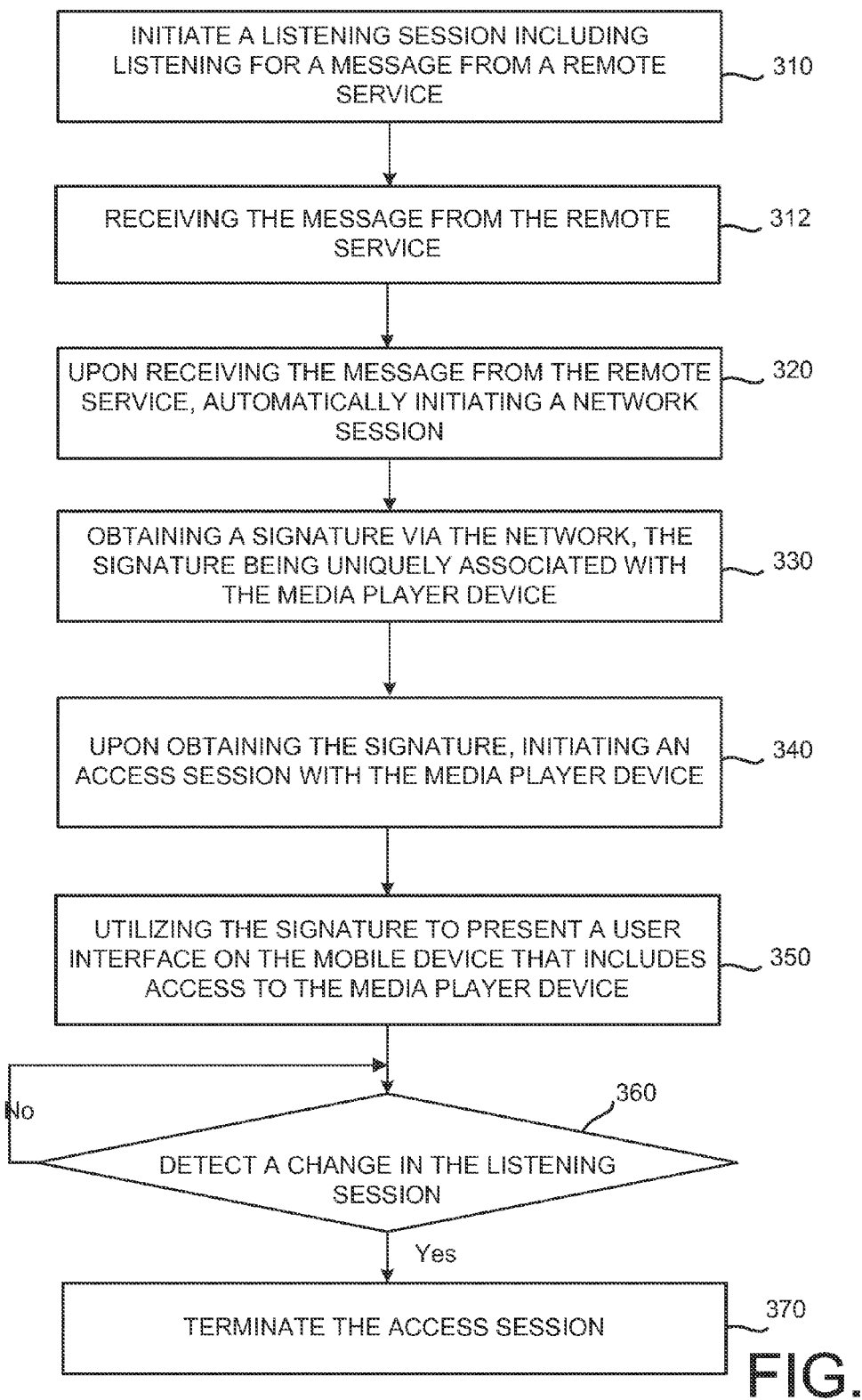
FIG. 3 is a flowchart of a process for providing device detection.

FIG. 3 is a flowchart of a process for providing device detection. The process illustrated in FIG. 3 may be performed at least in part by a computing device, for example, the mobile device 102 shown in FIG. 1 or the mobile device 210 shown in FIG. 2. As shown in FIG. 3, a mobile device may initiate a listening session including listening for a message from a remote service such as the location service 150 shown in FIG. 1 (310). In some implementations, the mobile device may initiate the listening session using an application downloaded (e.g., installed) from an online store.

The listening session may include receiving at the mobile the message from the remote service (312). The message indicates that a media player device is within a predetermined range of the mobile device (e.g., 500 feet).

In response to receiving the message from the remote service, the mobile device may automatically initiate a network session (320). The network session may include obtaining a signature via the network, the signature being uniquely associated with the media player device (330). In response to obtaining the signature at the mobile device, the mobile device may initiate an access session with the media player device (340). The access session may include utilizing the signature to present a user interface (e.g., via display screen 103 shown in FIG. 1) on the mobile device that includes access to the media player device (350).

The system (e.g., the mobile device or in some implementations the remote service) may determine whether it detects a change in the listening session (360). As an example of a change in the listening session, the remote service may determine that the mobile device is no longer within the predetermined range of the media player device. If no change is detected, (360, no) the system may continue with the access session while it continues to determine whether it detects a change in the listening session. If the system does detect a change in the listening session (360, yes), for example if the mobile device is no longer within the predetermined range of the media player device, the system (e.g., via the mobile device, the media player, and/or the remote service) may terminate the access session (370) (e.g., automatically, or with user input).

The process shown in FIG. 3 may begin again whenever the mobile device is turned on (even if a display screen is dimmed) or when certain applications executed on the mobile device are activated. In some implementations, such applications may execute in a background process of the mobile device. As an example, if a user was watching a movie with a friend but the user has left the house and taken his phone with him, the system may determine that the mobile device is no longer within 100 feet of the media player device, and thus may terminate the access session. In various alternative or additional implementations, the system may terminate the access session various ways, for example after a predetermined amount of time (e.g., minutes, hours), or in response to a user request to terminate the session (e.g., via the mobile device or via another device), when a user manually shuts down the system or mobile device, or when the system detects another mobile device in a predetermined range of the system that is requesting access to the media player device.

Figure 4:
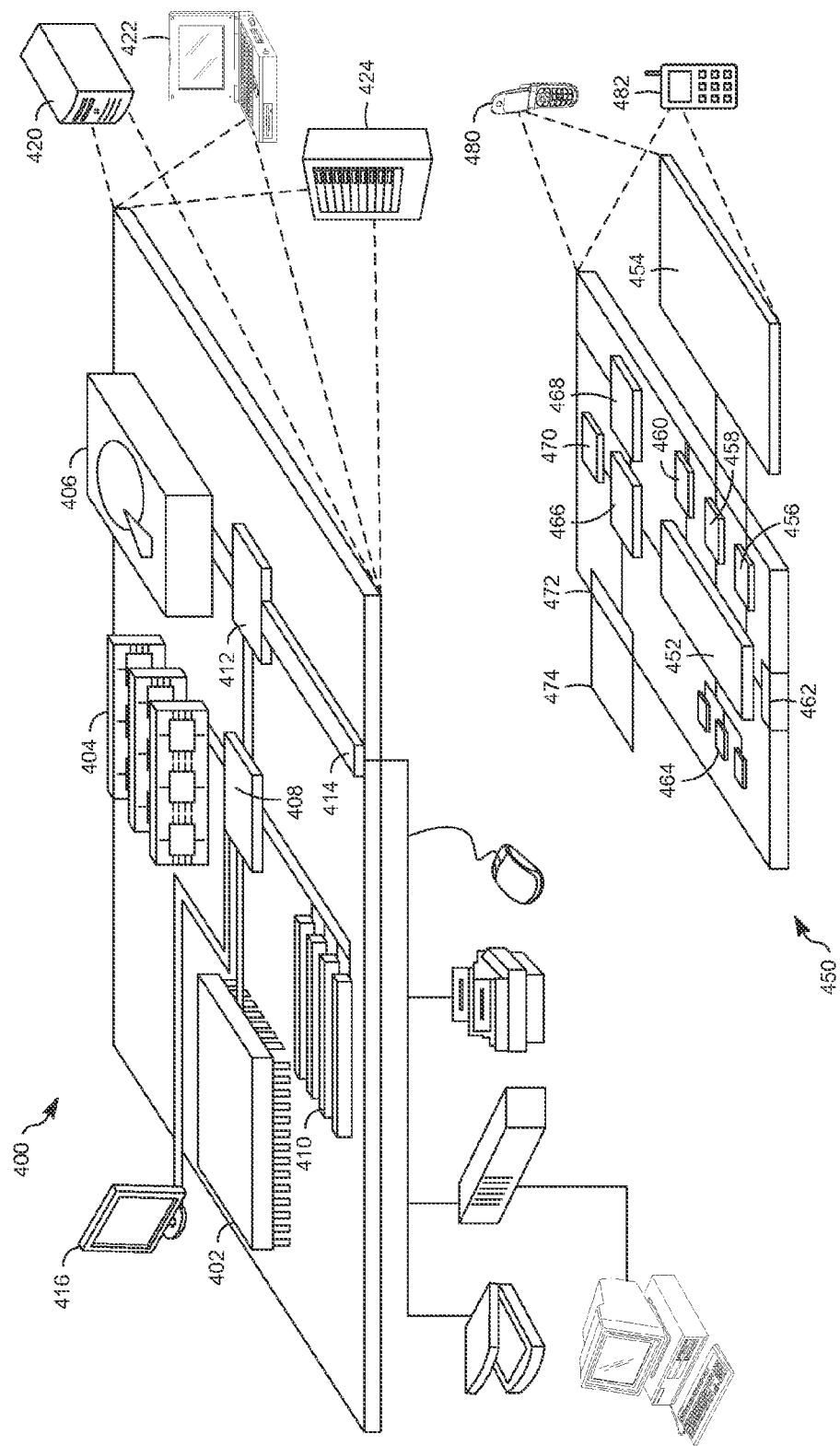
FIG. 4 illustrates an example of a computing device and a mobile computing device that can be used to implement the techniques described here.

FIG. 4 illustrates an example of a computing device and a mobile computing device that can be used to implement the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. In some implementations, the memory includes a combination of volatile and non-volatile memory units, for example as described above with respect to FIG. 3. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is illustrative only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion bus 414. The low-speed expansion bus, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, which may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a BLUETOOTH, WIFI, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 5:
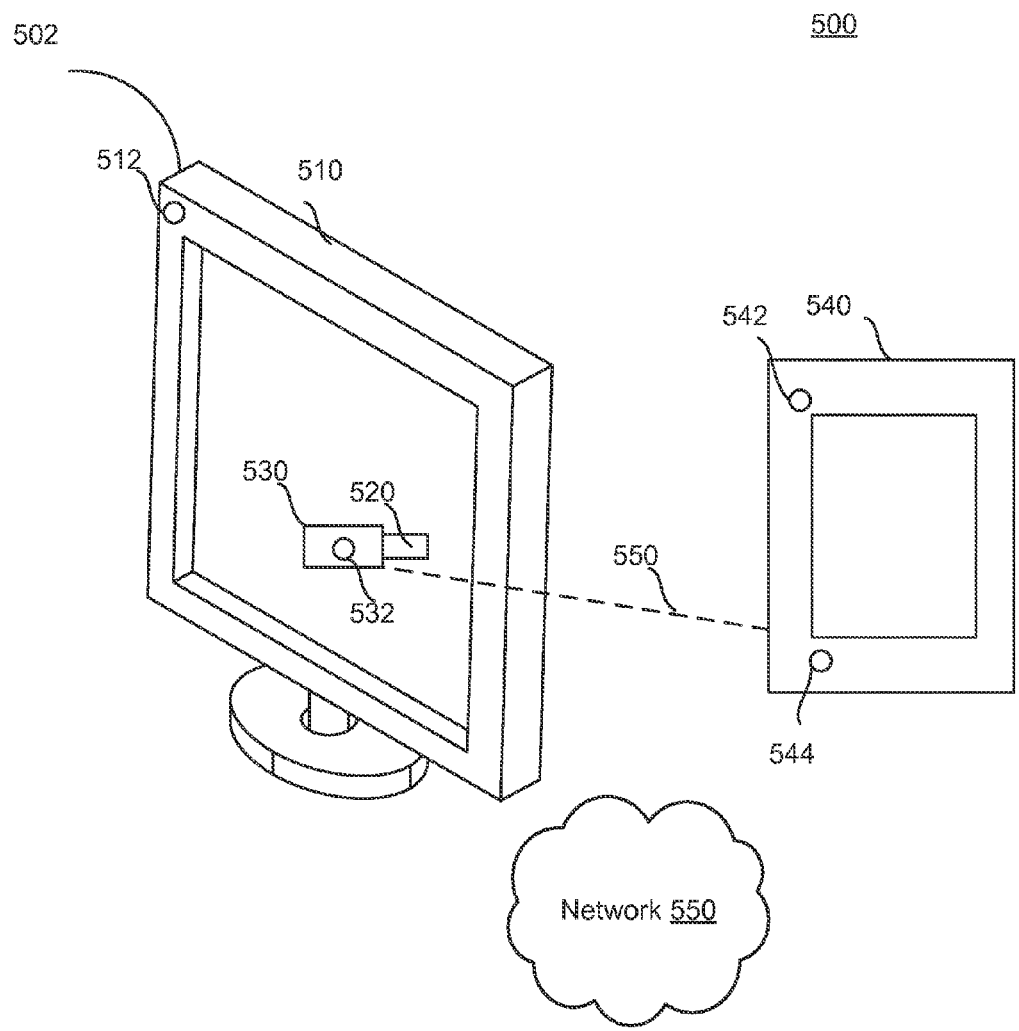
FIG. 5 is a block diagram of a system that can be used to provision a device.

FIG. 5 is a block diagram of a system that can be used to provision a device. The system 500 may include a device 502 that may include a display 510 and an audio output 512 (e.g., a speaker). The device 502 may be the device 130 shown in FIG. 1, as an example. A removable device 530 may be coupled to the device 502. The device 502 may, for example, include an input connection 520 into which the removable device 530 inserts a connection element (not shown). The input connection 520 may be located, as examples, on a back of the display 510, a side of the display 510, or elsewhere on the device 502. The configuration shown in FIG. 5 is for illustration only. In some examples, the removable device 530 may be an otherwise input-less device that may include a microphone 532. "Input-less" in such implementations means that the removable device 530 may lack other input elements, beyond a microphone, for a user (or other device) to enter input into the device 530. Other input elements would include, as examples, a keyboard, keys, physical buttons, a touch screen, a trackpad, a scroll wheel, or sensors.

The system 500 may also include at least one mobile device 540. As examples, the mobile device 540 may be a phone, laptop, tablet, hybrid device, or other device such as the examples as described above with respect to FIG. 4. As one example, the mobile device 540 may be the mobile device 102 shown in FIG. 1. The mobile device 540 may communicate, for example via a network such as the network 120 shown in FIG. 1, with the removable device 530, as described in more detail below with respect to FIG. 6. For example, the mobile device may issue and receive signals 550. The microphone 532 of the removable device 530 may be used to gather or generate information, for example by receiving such as audio waves and generating electrical signals, for the purpose of provisioning the removable device 530 to a network 550. For example, in some implementations for the removable device 530 to access a WIFI network (such as the network 550), the removable device 530 may utilize WIFI network identifier as well as a password for the WIFI network. Yet, to do that (e.g., from a different device with a keyboard), a user could not access the network settings and directly input the WIFI network identifier and password in a device that is an otherwise input-less device, because the user could not physically enter the WIFI network identifier and password into the device using keys, buttons, etc. For example, a device such as the removable device 530 may have no input elements to receive direct input from a user, other than a microphone 532. In some implementations, such as described in more detail below with respect to FIG. 6, the removable device 530 (e.g., via the microphone 532) may receive, via signals 550 such as sub-sonic or ultra-sonic signal waves, data such as a network identifier and a password to enable the removable device 530 to access the network (e.g., network 550). In some implementations, the removable device 530 may activate the microphone to detect audio only when the removable device 530 needs to be provisioned. For example, only when the removable device 530 attempts and cannot connect to a network, or when a connection to a network fails, may the removable device 530 turn on the microphone 532. In such implementations, when the removable device 530 is connected to a network such as the network 550, the removable device 530 may turn off or otherwise temporarily disable the microphone 532.

In some implementations, the removable device 530 may issue a challenge using a speaker (e.g., audio output 512) of the television or media player (e.g., the device 502) to which the removable device 530 is connected. In such an example, the removable device 530 may issue instructions, using a processor of the removable device 530 (not shown), to the device 502 (e.g., a television or other media player) to issue a challenge via the audio output 512 of the device 502. A mobile device 540 may issue a response to the challenge to be authenticated to the removable device 530. In some implementations, the mobile device 540 may only issue a response to the challenge if the mobile device 540 is in a predetermined range of the removable device 530. Examples of a detection of a mobile device within a predetermined range of another device are described in more above with respect to FIGS. 1 and 2. In one example, the removable device 530 may issue a challenge upon determining that the mobile device 540 is within the predetermined range of the removable device 530. In another example, the removable device 530 may periodically or continuously issue challenges. As described above in more detail with respect to FIG. 2, the mobile device 540 may receive a notification (for example, from a location service) that may include a message that the mobile device 540 is within a predetermined range (e.g., 100 feet) of the removable device 530. In response to receiving the notification, the mobile device 540 may automatically begin to search a network (e.g., the network 550) or to listen using its own microphone 544 for a signature signal (which, in this example, may include a challenge) from the removable device 530.

The mobile device 540 may use its own microphone 544 to receive the challenge, and use its own speaker 542 to issue a response. As one example, the challenge received at the mobile device 540 may be a request for a challenge password, and the response issued from the mobile device 540 may be the correct challenge password. In such an example, only after the mobile device 540 is authenticated to the removable device 530 (e.g., by matching the challenge password issued as the response from the mobile device 540, to the challenge password requested by the challenge from the removable device 530) will the mobile device 540 send a network password to the removable device 530 for the network, or a network identifier. In this way, a third party not involved in the communication would not easily access or intercept the network password for the network.

Figure 6:
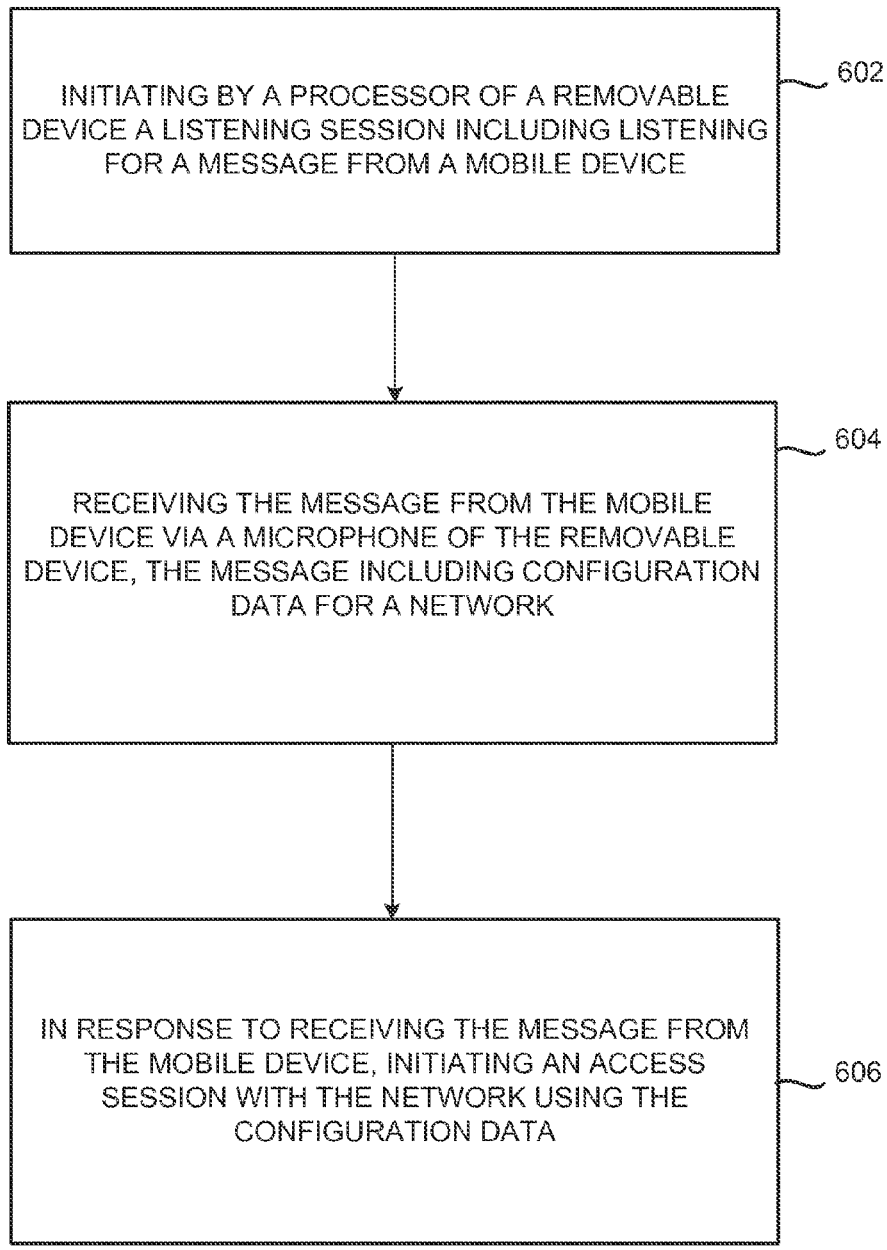
FIG. 6 is a flowchart of a process for provisioning a device.

FIG. 6 is a flowchart of a process for provisioning a device. The process shown in FIG. 6 may be performed at least in part by the removable device 530 as shown in FIG. 5. As shown in FIG. 6, the process includes initiating, by a processor of a removable device, a listening session including listening for a message from a mobile device (602). The process includes receiving the message from the mobile device via a microphone of the removable device (604), the message including configuration data for a network. The mobile device may be the mobile device 540 shown in FIG. 5. The removable device may be the removable device 530 shown in FIG. 5. The process includes, in response to receiving the message from the mobile device, initiating an access session with the network, using the configuration data (606).

In various implementations, the removable device is coupled to a television. For example, as shown in FIG. 5, the removable device 530 is coupled to the device 502, which may be a television. In various implementations, the signature is encoded in a sub-sonic signal, for example a low frequency signal. As one example, the sub-sonic signal may be a pulse coded modulation (PCM) signal. PCM is a method used to digitally represent sampled analog signals.

In various implementations, the message may include configuration data. This configuration data may include one or more of a secure identifier, password, or preferred network identifier. For example, a secure identifier may be an SSID for a specific WIFI network. A password may be a specific password for the WIFI network. A preferred network identifier may be the name of a specific WIFI network. The removable device may receive the message over an audio channel (e.g., via a microphone or other audio input of the removable device), and the removable device may interpret the message, to provision the removable device.

Figure 7:
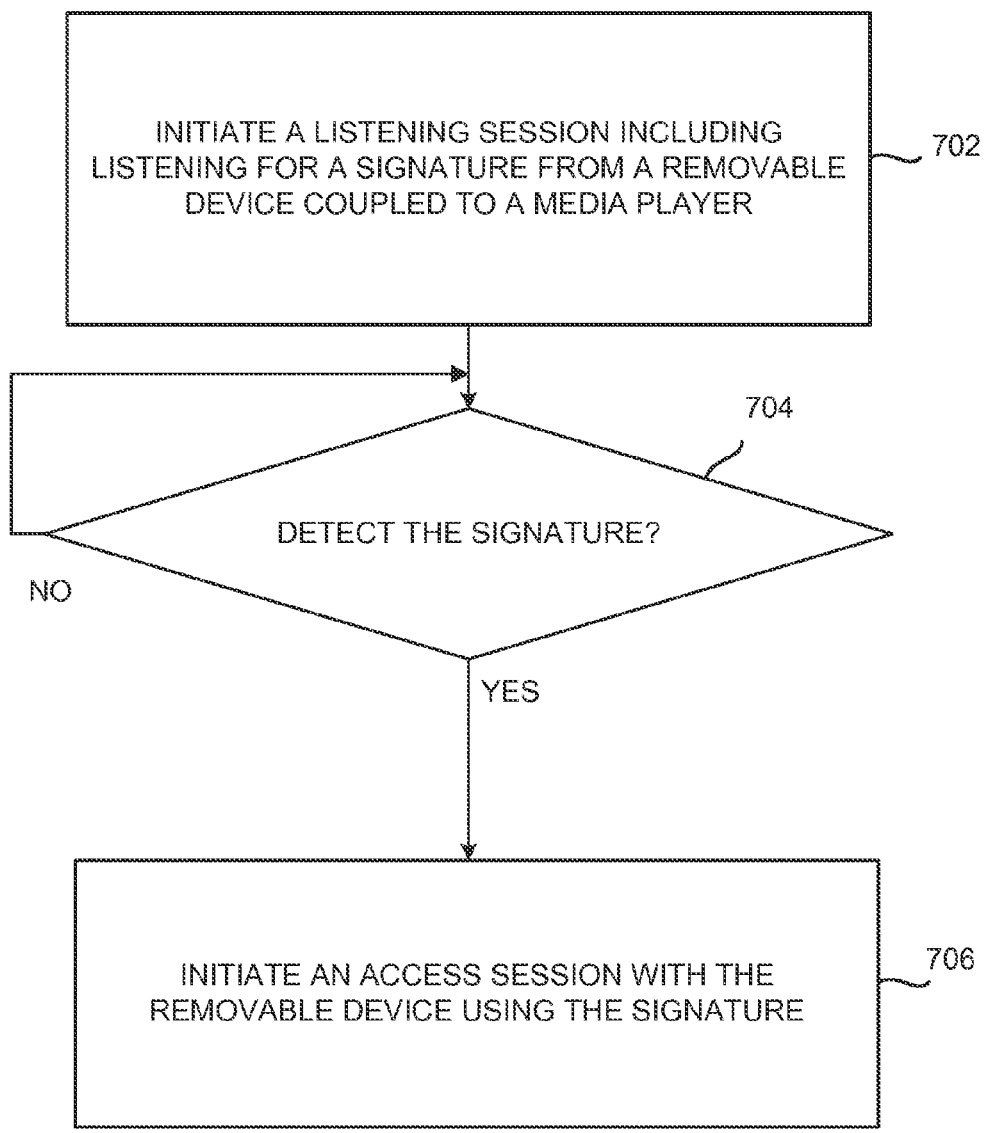
FIG. 7 is a flowchart of a process for pairing a removable device and a mobile device.

FIG. 7 is a flowchart of a process for pairing a removable device and a mobile device. The process shown in FIG. 7 may be performed at least in part by a mobile device such as the mobile device 540 shown in FIG. 5 or the mobile device 102 shown in FIG. 1. As shown in FIG. 7, the process may include initiating, by a processor of a mobile device, a listening session including listening for a signal including a signature from a removable device coupled to a media player such as a television (702). The removable device may be the device 530 shown in FIG. 5. The mobile device may detect the signature (704), for example if the mobile device is within a predetermined range of the removable device, for example as described above with respect to FIGS. 1 and 2. If the mobile device detects the signature (704, yes), the mobile device may initiate an access session with the removable device using the signature (706). If not (704, no), the mobile device may continue to listen for the signature.

The signature is a unique pattern that includes access information that allows the mobile device to pair with the removable device. The unique pattern may correspond to an alphanumeric string, for example. The pairing may be performed without requiring additional user input, in some examples. In some implementations, the removable device may initiate a broadcast session including broadcasting a signature from the removable device. The signature may be a sub-sonic signature, such as a pulse coded modulation signal as one example. The mobile device may interpret the signature to pair with the removable device.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method, comprising:
receiving, by a processor of a device coupled to a media player, a notification from a location service that a mobile device is within a predetermined range of the device;
activating a microphone of the device in response to the notification received from the location session;
initiating, by a processor of the device, a listening session including listening for a sub-sonic signal including a message from a mobile device;
receiving, by the microphone of the device, the sub-sonic signal including the message from the mobile device using only the microphone of the device, the message including configuration data for a network, the configuration data including at least one of a secure identifier, a password, or a preferred network identifier for access to the network, the network being independent of the listening session; and
in response to receiving the sub-sonic signal including the message from the mobile device, initiating, by the processor of the device, an access session with the network using the configuration data, wherein a user interface displayed on the device is configured to be remotely controlled by a user interface of the mobile device via the access session.

2. The method of claim 1, wherein the device is coupled to a media player.

3. The method of claim 2, wherein the media player is a television.

4. The method of claim 1, wherein the network includes at least one of a WIFI network, a BLUETOOTH network, an audio channel, or a near field communication network.

5. The method of claim 1, wherein the initiating occurs after the device fails to connect to any network.

6. A method, comprising:
receiving a notification from a location service that a mobile device is within a predetermined range of a removable device;
activating a microphone of the mobile device in response to the notification;
generating, by a processor of the mobile device, a first sub-sonic signal including a message for receipt by a removable device using only a microphone of the removable device over a first listening session, the message including configuration data for a network, the configuration data including at least one of a secure identifier, a password, or a preferred network identifier for access to the network, the network being independent of first listening session;
initiating, by the processor of the mobile device, a second listening session in response to the first listening session, the second listening session including listening for a signature from the removable device, wherein the removable device is coupled to a media player and wherein the signature is encoded in a second sub-sonic signal;

detecting the signature; and in response to detecting the signature, initiating, by the processor of the mobile device, an access session with the removable device, using the signature, the mobile device including a user interface configured to remotely control a user interface displayed on the media player coupled to the removable device via the access session.

7. The method of claim 6, further comprising:

initiating a broadcast session including broadcasting the signature from the media player.

8. The method of claim 6, wherein the media player is a television.

9. The method of claim 6, wherein at least one of the first sub-sonic signal and the second sub-sonic signal is a pulse coded modulation signal.

10. The method of claim 6, further comprising:

interpreting the signature by the mobile device.

11. The method of claim 6, wherein the signature is a unique pattern and includes access information that allows the mobile device to pair with the removable device.

12. A system comprising:

at least one processor; and a memory that stores instructions that, when executed by the at least one processor, cause the system to perform operations of:

receive a notification from a location service that a mobile device is within a predetermined range of a removable device;

activating a microphone of the mobile device in response to the notification;

generate a first sub-sonic signal including a message for receipt by the removable device using only a microphone of the removable device over a first listening session, the message including configuration data for a network, the configuration data including at least one of a secure identifier, a password, or a preferred network identifier for access to the network, the network being independent of first listening session;

initiate a second listening session in response to the first listening session, the second listening session including listening for a signature from the removable device, wherein the removable device is coupled to a media player and wherein the signature is encoded in a second sub-sonic signal; and in response to detecting the signature from the removable device, initiate an access session with the removable device, using the signature, the mobile device including a user interface configured to remotely control of a user interface displayed on the media player coupled to the removable device via the access session.

13. The system of claim 12, wherein at least one of the first sub-sonic signal and the second sub-sonic signal is a pulse coded modulation signal.

14. The system of claim 12, wherein the signature is a unique pattern and includes access information that allows the system to pair with the removable device.

15. The system of claim 12, wherein the instructions further comprise instructions that, when executed by the at least one processor, cause the system to perform operations of:

receiving a challenge from the removable device; and issuing a response to the challenge.

16. The system of claim 15, wherein the response is an audio signal.

17. The system of claim 12, wherein the media player is a television.

* * * * *